United States Patent [19]

Csikós et al.

[11] Patent Number: 4,579,722

[45] Date of Patent: Apr. 1, 1986

[54] PROCESS FOR TREATING ALUMINA RAW MATERIALS

[75] Inventors: Rezsö Csikós; József Báthory; István Farkas, all of Veszprém, Hungary

[73] Assignee: Budapesti Müszki Egyetem, Budapest, Hungary

[21] Appl. No.: 715,703

[22] Filed: Mar. 25, 1985

[51] Int. Cl.$^4$ ................................................. C01F 7/08
[52] U.S. Cl. .................................... 423/121; 423/120; 423/133; 423/149; 423/417
[58] Field of Search ............... 423/120, 121, 133, 149, 423/417

[56] References Cited

U.S. PATENT DOCUMENTS 3,295,924  1/1967  Colombo ........................ 423/120 X
3,493,327  2/1970  Cook .................................. 423/120
4,146,573  3/1979  Kane ............................... 423/121 X Primary Examiner—W. J. Shine Attorney, Agent, or Firm—Gabriel P. Katona

[57] ABSTRACT

The invention relates to a process for deironing red mud and bauxite and for the preparation of a raw material for alumina industry and of iron pentacarbonyl which comprises (a) activating the red mud or bauxite starting material at 150°–800° C. under a pressure of 0.1–100 bars in a reducing gas stream in the presence of one or more promoter(s) and thereafter (b) carbonylating at 50°–300° C. under a pressure of 25–300 bars with carbon monoxide or a gas containing carbon monoxide and removing the iron pentacarbonyl formed from the system.

The advantage of the present invention is that it provides a process for the effective removal of the iron content of red mud or bauxite and moreover it enables the utilization of the removed iron in the valuable form of iron pentacarbonyl which is suitable for use in iron metallurgy.

6 Claims, No Drawings

PROCESS FOR TREATING ALUMINA RAW MATERIALS

TECHNICAL FIELD

This invention relates to a process for deironing red mud and bauxite and for the preparation of a high quality raw material for alumina industry. In the course of the process iron pentacarbonyl, a valuable raw material for powder metallurgy, is formed as by-product.

It is an object of the present invention to provide a process for making red mud, formed in the manufacture of alumina, iron-free and to provide a raw material suitable for use of alumina industry from red mud accumulated during decades.

It is a further object of the present invention to elaborate a process for making bauxite iron-free and thus provide a raw material having a low iron content and being enriched in aluminium oxide for the alumina industry.

According to this process the iron-content of the bauxite starting material is decreased by 80-95% or even by a larger extent and thus the capacity of the existing alumina factories can be increased by 20-25%. An other advantage of this process is that the amount of red mud formed in the course of aluminium production and that of waste aluminium oxide can be significantly diminished.

According to the process of the present invention iron is removed in the form of iron pentacarbonyl from red mud or bauxite and high purity powdery iron pentacarbonyl can be prepared from this by-product. Thus the raw material supply of rapidly developing powder metallurgy can be provided and the amount of waste materials can be decreased.

BACKGROUND ART

Aluminium is generally prepared by the Bayer process by means of electrolysis of pure alumina obtained from bauxite. The aluminium oxide content of bauxite of good quality is approximately 50%. The impurities of alumina—particularly iron oxide and iron oxyhydrate being present in an amount of about 25%—are removed by treatment with alkali under pressure. The red mud formed in this step contains 40-45% of iron oxide and 10-20% of aluminium oxide. Since there is no known suitable technology for the working-up of red mud, in the neigbourhood of alumina factories several million tons of red mud are accumulated and the storage and laying of immense quantities of red mud causes serious problems.

Bauxites of lower quality having a small aluminium oxide content and a high iron oxide content can not be worked up by the Bayer process in an economical manner.

The process of the present invention enables the working up of red mud and bauxites of various quality. Thus the process of the present invention can improve the raw material supply of alumina factories and can contribute to the reduction of bauxite mining and the considerable amount of iron pentacarbonyl formed in the process can enhance the intensive development of iron powder metallurgy. Moreover, large valuable fields presently used for the storing of red mud can be used for agricultural purposes.

The problem of working-up and utilization of red mud and making bauxites iron-free has been intensively studied all over the world. Several publications and patent specifications deal with the problem of increasing the production of aluminium oxide and aluminium by reducing the iron content of bauxite. However, the said prior art methods have not been used on industrial scale so far at all or their use was very limited. This can be attributed to fact that the said known technologies are complicated, expensive, by-products are formed which can not be worked-up, large amounts of auxiliary agents are required, the energy-need is high and the processes are not selective.

According to a wide-spread view, red mud is a potential secondary raw material source [Thakur, R. S., Sant. B. R.: *Chem. Era,* 1980 16 (5) 106-7; Zimmer, E.: *Aluminium* (Düsseldorf) 1980, 56 (10), 639-42].

According to other process [Yoshii Chikao, Ishimra Koutaro, Hokkaido Daigaku Kogakubu Kenkyu Hokoku, 1978, (89) 1-6] red mud is roasted in the presence of calcium oxide as slag forming agent at a temperature of 1450° C. thereafter the roasted product is treated with a melted alkali and red mud and aluminium are dissolved in the form of $NaAl_2O_2$.

According to a further process (Matyash, V. G., Kudinov, B. Z., Leontev, L. I.: *Tr. Inst. Metall.,* Akad. Nauk USSR. Ural. Neuchn. Tsentr. 1977, 30, 103-5) the starting material is roasted with calcium oxide at a temperature of 1100° C. and this step is combined with reduction by semi-coke. Thus 80% of the iron content can be removed.

According to still further process [Ejima, Tatsuhiko, Shimakage Kazuyoshi, Hoshi Nasayoshi: *Keikinzoku,* 1978, 28 (9) 443-9] roasting is accomplished at 450° C. with $NH_4HSO_4$. Aluminium and iron are dissolved from the roasted product with sulfuric acid.

According to a further process [Logomerac, V. G.: Trav. Com. Int. Etude Bauxites, *Alumine Alum.* 1979, 15, 279-851] roasting is carried out in an electric furnace whereupon the metals are dissolved with 30% sulfuric acid and the valuable components are recovered by extracting with bis-2-ethyl-hexyl phosphoric acid.

According to an other method roasting is carried out at 400°-1000° C. in the presence of $FeSO_4$ and the sulphates formed are separated from $SiO_2$ by dissolving them in water [Mitsui Alumina Seizo K. K.: Jpn. Kokai Tokkyo Koho 8177,309 Nov. 29, 1979].

Several procedures are based on using strong acids, e.g. hydrochloric acid, sulfuric acid or sulfur trioxide [Zimmer, E.: *Aluminium* (Düsseldorf) 1980, 56 (10) 639-42; Hungarian Pat. No. 150,459; U.S. Pat. No. 3,185,545; Hungarian Pat. No. 179,799]. According to these processes dried and ground red mud is treated with the acid in a counter-current and the metal salt formed is converted into the corresponding oxide by roasting.

A very interesting method is disclosed in British Pat. No. 2,078,211. Neutralized red mud is separated into two fractions by the aid of a magnet; one of the fractions is enriched in iron, while the other has a low iron content.

In the Bayer-process the iron content of bauxites having a high iron content can be reduced on the account of increasing the amount of lime by 15-20% [Pauker, V. I., Zubarev, V. I., Simakova, L. G. (USSR) (Tsvetn) *Tsvetn. Met.* 1980, (7) 79-83].

According to an other group of procedures iron is removed as iron chloride. Bauxite is dried and calcinated at an elevated temperature of 600°-700° C., ground and treated in counter-current with hydrochloric acid or gaseous chlorine. In the said process aluminium is also converted into chloride and is to be separated from the iron, titanium, magnesium, calcium and silicium chlorides by fractionated distillation or can be selectively dissolved from the above compounds [Zotikova, A. N., Kozlov, V. M., Vinkelberg, V. G., Guseva, N. S., Pavlova, L. M.: (USSR) *Ref. Zh. Metall.* 1979. Abstr. No. 12 G 175.; Foley, E., Wadsley, M. W.: British Pat. Spec. 2,023,113 Dec. 28, 1979; Zotikova, A. N., Vinkelberg, V. G., Pavlova, L. M., Minina, K. P.: (USSR) *Ref. Zh. Khim.* 1982. Abstr. No. 1 L 98.; Kapoly L., Szabó Lné, Czeglédi B., Stocker L., Riederauer Sz., Stocker L.: "Hazai bauxitok vastalanítása" Tatabánya, Nov. 1, 1982].

According to certain procedures the aluminate solution formed in the Bayer-process is treated with hydrochloric acid and iron is separated from this solution by the aid of organic phosphates or oxidizing agents [Ni, L. P., Savchenko, A. I.: (USSR) *Kompleksn. Ispolz. Miner. Syrya*, 1980, (6) 81–83.; Cocco, A., Colussi, I., Kikic, I., Meriani, S.: *Int. Solvent Extr. Conf. (Proc)* 1980, 3. Paper 80-186, 7 pp.].

According to works published by Hungarian researchers bauxite having a high iron content or bauxite enriched with red mud is treated with ammonium chloride at a high temperature and thereby iron is removed in the form of $Fe(OH)_3$ or $FeCl_3$ [Zámbó J., Molnár L., Siklósi P.: Bányász. Kohász Lapok Kohász, 1980, 113 (6) 270–3.; Zámbó J., Molnár L., Siklósi P.: *Trav. Com. Int. Etude Bauxites, Alumine Alum.* 1981, 16, 183–92].

According to the said procedures about 70–80% of the iron content can be removed in a very complicated manner and in most cases aluminium is obtained as chloride.

Several publications deal with the preparation of iron pentacarbonyl. However, none of the references relate to the preparation of iron pentacarbonyl from red mud or bauxite.

Iron pentacarbonyl was discovered in France in 1891 by M. Berthelott [Berthelott, M.: *Compt. rend.* 112, 1343 (1891), 113, 679 (1892)] and independently from the above author in England by Mond et al [Mond, L., Langer, C.: *J. Chem, Soc.* 59, 1090 (1891)]. For obtaining iron pentacarbonyl iron powder obtained by the reduction of iron oxalate was reacted with carbon monoxide under atmospheric pressure. In order to improve the low yields the CO-pressure was increased up to 300 bars; but however they failed to reach a conversion of 100%.

According to Mittasch A. [Mittasch, A.: *Z. Angew. Chem.* 41, 827 (1928)] and Hieber et al [Hieber, W.: Metallcarbonyle, *FIAT Review. Inorg. Chem. Part.* II. 108-145 (1946)] very good results were obtained by using Raney-iron as starting material.

Reppe et al prepared iron carbonyl from iron sulfate at high temperature and under high pressure [Reppe, W.: Ann. Chem. 1953. No. 582, 116–121].

Industrial scale production of iron pentacarbonyl is carried out by starting from iron powder—obtained by reduction of iron oxides—at 180°–200° C. under a CO-pressure of 200 bars [Szirkin, V. G.: *Karbonylnie Metalli,* Moszkva, 1978 p. 98].

SUMMARY OF THE INVENTION

According to the process of the present invention dried red mud or ground bauxite is preferably activated in the presence of activation and carbonylation promoting agents, so-called "promoters", under 0.1 to 100 bars pressure at a temperature of 150°–800° C. in a hydrogen-containing reducing gas, preferably in a gas current free of carbon monoxide, whereupon it is carbonylated at a temperature of 50°–300° C. under a carbon monoxide pressure of 25–300 bars.

The process of the present invention is the only process of bauxite industry whereby almost the whole iron content of red mud or bauxite can be selectively removed in the form of iron pentacarbonyl. Red mud and bauxite contain several kinds of metals but from these iron can react with carbon monoxide with the largest reaction rate and the volatile liquid iron pentacarbonyl formed can be easily removed.

DETAILED DESCRIPTION OF THE INVENTION

According to the process of the present invention the removal of iron is carried out in a single step, in the absence of any solvent, by using ground solid starting material and no by-products are formed. Thus almost the total aluminium oxide content of red mud and bauxite can be recovered and the iron content can be removed in the form of a high purity product.

It is to be emphasized that to the contraty to the majority of procedures of chemical industry in the process of the present invention absolutely no undesired by-products are formed and thus the present invention is a nice example of modern methods avoiding environmental pollution.

According to the process of the present invention dried red mud or ground bauxite is preferably activated in the presence of activation and carbonylation promoting agents so-called "promoters" under 0.1 to 100 bars pressure at a temperature of 150°–800° C. in a hydrogen-containing reducing gas, preferably in a gas current free of carbon monoxide, whereupon it is carbonylated at a temperature of 50°–300° C. under a carbon monoxide pressure of 25–300 bars.

In the course of the procedure elementary sulfur, an inorganic or organic sulfur compound (e.g. $H_2S$, HgS, CuS, FeS, mercaptane) or sulfur containing mineral substance or substances or HgO, CuO, elementary iodine or an iodine compounds (e.g. HI, CuI) or a mixture thereof may be used as promoters in an amount of 0.5–30% calculated for the weight of the starting material. The promoter is varied depending on the composition, iron content, alkali metal content and lime content of the starting material E.g. the alkali and lime content of red mud is higher than that of bauxite. Thus if red mud is used as starting material it is preferred to use an acidic promoter (e.g. S, $H_2S$ or HI) or a mixture thereof. On the other hand if bauxite is worked-up, it is preferable to use elementary sulfur, mercaptane, HgO, CuO, FeS or $FeCO_3$ or a mixture thereof.

The iron compounds being present in the starting raw material suffer thermal decomposition during the activation procedure due to the high temperature. Thus, the thermal decomposition of oxyhydrates, carbonates, hydroxides and other iron compounds results in iron oxide, which is reduced by hydrogen to active iron. During the activation step, the promoters facilitate the decomposition and reduction of the iron compounds. The promoters also increase the rate of formation of the carbonyl compound.

As reducing gas pure hydrogen, preferably a gas free from carbon monoxide, water gas, ammonia or a gas containing hydrogen and/or ammonia can be used. The activation can be preferably carried out under atmospheric pressure. The preferable temperature for this step is 150°–300° C.

After the activation step the activated red mud or bauxite is cooled from the high activating temperature to the carbonylation temperature of 50° to 300° C., preferably to 50° to 80° C. whereupon it is reacted with carbon monoxide under a pressure of 25–300 bars. Pure carbon monoxide, blown gas, synthesis gas containing carbon monoxide, generator gas or producer gas can be used for carbonylation. Carbonylation is an exothermic reaction and the increase of temperature indicates the formation of iron pentacarbonyl. Simultaneously with its formation iron pentacarbonyl is condensed under pressure, continuously led out of the reactor to a storing tank under CO flow.

Surprisingly we found that in the course of the activation and carbonyl formation steps the effect of promoters is increased if more than one promoter—i.e. sulfur powder or organic or inorganic sulfur containing promoters—is used. When using two or more promoters, the resultant effect is not additive but surprisingly and unexpetedly synergistic.

Presumably when using two or more promoters, iron forms active intermediate compounds with the promoters and the active compounds thus formed can react with carbon monoxide more easily. The carbonylation step covers a ligandum-exchange process in this case; the ligands bonded to iron are exchanged to carbon monoxide. The sum of the activation energies of these two processes is much less than the activation energy necessary for simply binding the carbon monoxide ligands to iron. The reduction in the sum of the activation energies is caused by the promoters and, therefore, promoters facilitate the formation of iron pentacarbonyl.

The optimal synergistic effect of the promoters depends on the chemical composition of the starting red mud and for this reason the optimal amount of the promoters is to be determined for each red mud raw material by particular experiments. After determining the chemical composition of red mud or bauxite, pre-experiments are made in a laboratory scale reactor by using samples of 100 g with various promoter combinations and the results of the said pre-experiments are compared.

Further details of the present invention are to be found in the following Examples without restricting the scope of protection to the said Examples.

EXAMPLE 1

100 g of dry ground red mud [aluminium oxide content 15.9 g; iron oxide content 43.1 g (Fe=30.1 g)] are heated in a 500 ml stainless steel reactor under stirring in hydrogen flow with a heating velocity of 50° to 60° C./hour to 350° C. and activated at this temperature in the presence of hydrogen under a pressure of 20 bars and under stirring for 12 hours. The activated red mud is cooled to 150° C. and carbonylated under a carbon monoxide pressure of 50 bars under stirring for 10 hours. The formed liquid iron pentabarconyl is cooled and removed from the reactor. The residue remained in the autoclave contains 15.2 g of iron. Thus the 49.5% of the total iron content of the raw material could be removed. As a result of the deironing step the aluminium oxide content of red mud is increased from 15.9% to 22.0%.

EXAMPLE 2

100 g of dry ground red mud [aluminium oxide content 15.9 g; iron oxide content 43.1 g (Fe=30.1 g)] are thoroughly admixed with 2 g of sulfur powder whereupon the mixture is heated in a 500 ml stainless steel reactor under stirring in hydrogen flow with a heating velocity of 50°–60° C./hour to 700° C. and activated at this temperature under stirring and under a pressure of 30 bars for 12 hours. The activated red mud is carbonylated under a carbon monoxide pressure of 150 bars, at a temperature of 200°–210° C. under stirring for 10 hours. The liquid iron pentacarbonyl formed is removed from the reactor under cooling. The residue in the autoclave contains 8.2 g of iron. Thus the rate of iron removal amounts to 72.8%. As a result of the iron removal step the aluminium oxide content of red mud is increased from 15.9% to 24.3%.

EXAMPLE 3

100 g of dry ground red mud [aluminium oxide content 15.9 g; iron oxide content 43.1 g (Fe=30.1 g)] are thoroughly admixed with 5.5 g of iron sulfide (S=2 g) and heated in a 500 ml stainless steel reactor under stirring in a hydrogen current with a heating velocity of 50°–60° C./hour to 400° C. and activated at this temperature in the presence of hydrogen under atmospheric pressure for 12 hours. The activated red mud is carbonylated at 230° C. under a carbon monoxide pressure of 115 bars under stirring for 10 hours. The liquid iron pentacarbonyl formed is removed from the reactor under cooling. The red mud in the autoclave contains 8.5 g of residual iron. The rate of iron removal amounts to 71.8%. As a result of the iron removing step the aluminium oxide content of the red mud is increased to 24.2%.

EXAMPLE 4

100 g of dry ground red mud [aluminium oxide content 12.9 g; iron oxide content 42.4 g (Fe=29.7 g)] are thoroughly admixed with 2.7 g of iron sulfide (S=1 g) and 1 g of sulfur powder. The mixture is heated in a 500 ml stainless steel reactor under stirring in a hydrogen current with a heating velocity of 40°–60° C./hour to 600° C. and activated at this temperature in the presence of hydrogen under atmospheric pressure for 12 hours. The activated red mud is carbonylated at 200° C. under a carbon dioxide pressure of 90 bars under stirring for 10 hours. The liquid iron pentacarbonyl formed is removed from the reactor under cooling. The residual red mud contains 2 g of iron. The rate of iron removal amounts to 93.3% and results in an increase of the aluminium oxide content of red mud to 21.6%.

EXAMPLE 5

100 g of ground dry red mud [aluminium oxide content 12.9 g; iron oxide content 42.4 g (Fe=29.7 g)] are thoroughly admixed with 2 g of sulfur powder and 4 g of finely powdered pyrite (composition: $H_2O$=1.0%; S=50.6%; Fe=45.5%; $SiO_2$=0.9%; Zn=0.10%; Cu=0.31%; Pb=0.2%; As=0.09%; Ca=0.49%; Mg=0.05%). The mixture is heated in a 500 ml stainless steel reactor under stirring in hydrogen current with a heating velocity of 50°–60° C./hour to 500° C. and activated at this temperature in the presence of hydrogen under stirring and under an atmospheric pressure for 12 hours. The activated red mud is carbonylated under stirring at 200° C. under a carbon monoxide pressure of 90 bars for 10 hours. The liquid iron pentacarbonyl formed is removed from the reactor under cooling. The residual red mud contains 0.8 g of iron, the rate of iron removal amounts to 97.3% and results in an increase of the aluminium oxide content of red mud to 22.0%.

EXAMPLE 6

100 g of dry ground red mud [aluminium oxide content 12.9 g; iron oxide content 42.4 g (Fe=29.7 g)] are thoroughly admixed with 1.5 g of sulfur powder and 3 g of finely ground pyrite (composition: $H_2O=1.0\%$; $S=50.6\%$; $Fe=45.5\%$; $SiO_2=0.9\%$; $Zn=0.10\%$; $Cu=0.31\%$; $Pb=0.2\%$; $As=0.09\%$; $Ca=0.49\%$; $Mg=0.05\%$). The mixture is heated in an 500 ml stainless steel reactor under stirring in a hydrogen current with a heating velocity of 50°-60° C./hour to 500° C. and activated at this temperature under atmospheric pressure under the slow introduction of hydrogen for 12 hours. To the hydrogen passing through the red mud continuously, a total amount of 2 g of ethyl mercaptane is added. The activated red mud is carbonylated under stirring at 200° C. under a carbon monoxide pressure of 90 bars for 10 hours. The liquid iron pentacarbonyl formed is removed from the reactor under cooling. The residual red mud contains 1.0 g of iron, the rate of iron removal amounts to 96.6%. As a result of the step of iron removal the aluminium oxide content of the starting red mud is increased from 12.9% to 22.0%.

EXAMPLE 7

100 g of dry ground red mud [aluminium oxide content 12.9 g; iron oxide content 42.4 g (Fe=29.7 g)] are thoroughly admixed with 0.75 g of elementary iodine and 1.12 g of CuI. The mixture is heated in a 500 ml stainless steel reactor under stirring in hydrogen current with a heat velocity of 50°-60° C. to 485° C. and activated at this temperature for 10 hours. The charge of the reactor is cooled to 180° C. and carbonylated under a carbon monoxide pressure of 110 bars for 8 hours. The iron pentacarbonyl formed is condensed under pressure and water-cooling and the liquid formed is continuously removed in carbon monoxide current. The residual red mud contains 0.95 g of iron, the rate of iron removal amounts to 96.8%. The aluminium oxide content of the residue is increased to 22.0%.

EXAMPLE 8

A 100 g fraction of dry bauxite [aluminium oxide content 50.7%; iron oxide content 24.4% (Fe=17.1%)] having a particle size of 300-400μ is admixed with 0.5 g of powdered sulfur and the mixture is introduced into an 500 ml stainless steel autoclave. The charge of the reactor is heated in hydrogen current with a heating velocity of 50°-60° C. to 350° C. and activated at this temperature for 12 hours. The activated bauxite is cooled to 200° C. and carbonylated under a carbon monoxide pressure to 180 bars at 190°-210° C. for 10 hours. The iron pentacarbonyl formed is continuously removed from the system under cooling. The aluminium oxide content of the residual bauxite amounts to 61.9%. The iron content is decreased from 17.1% to 6.3% and the rate of iron removal is 63.2%.

EXAMPLE 9

100 g of dry ground bauxite [aluminium oxide content 50.7%; iron content 17.1% ] are admixed with 2 g of sulfur powder and placed in a 500 ml stainless steel reactor. The mixture is heated in hydrogen current with a heating velocity of 60° C./hour to 500° C. and activated at this temperature under a hydrogen pressure of 25 bars for 12 hours. After activation the reaction mixture is cooled to 200° C. and carbonylated under a carbon monoxide pressure of 150 bars at 200° C. for 10 hours. The iron pentacarbonyl formed is condensed under pressure and continuously removed. The residual bauxite contains 62.7% of $Al_2O_3$ and 5.2% of iron. The rate of iron removal is 69.6%.

EXAMPLE 10

100 g of dry bauxite [aluminium oxide content 50.7%; iron oxide content 24.4% (Fe=17.1%)] are thoroughly admixed with 3 g of sulfur powder. The mixture is led into a 500 ml stainless steel autoclave and heated in hydrogen current with a heating velocity of 50°-60° C. to 600° C. and activated at this temperature under atmospheric pressure for 12 hours. The activated bauxite is cooled to 190° C. and carbonylated under a carbon monoxide pressure of 115 bars for 10 hours. The iron pentacarbonyl formed is continuously removed from the system under cooling. The aluminium oxide content of the residual bauxite amounts to 63.5%. The iron content is decreased from 17.1% to 4.3%. The rate of iron removal amounts to 74.9%.

EXAMPLE 11

100 g of dry ground bauxite [aluminium oxide content 50.7%; iron oxide content 24.4% (Fe=17.1%)]are thoroughly admixed with 20 g of sulfur powder. The mixture is charged into a 500 ml stainless steel autoclave and heated to 700° C. in hydrogen stream with a heating velocity of 50°-60° C. and activated at this temperature under stirring and under atmospheric pressure for 12 hours. The activated bauxite is carbonylated at 200° C. under a carbon monoxide pressure of 90 bars for 10 hours. The iron pentacarbonyl formed is continuously removed from the system under cooling. The aluminium oxide content of the residual bauxite amounts to 66.0%; the iron content is decreased from 17.1% to 1.3%. The rate of iron removal amounts to 92.4%.

EXAMPLE 12

100 g of dry ground bauxite [aluminium oxide content 50.7%; iron oxide content 24.4% (Fe=17.1%)] are changed into a 500 ml stainless steel autoclave and heated with a heating speed of 50°-60° C./hour to 500° C. while a mixture of ammonia and synthesis gas is introduced. The starting material is activated at this temperature for 12 hours under atmospheric pressure while systhesis gas is continuously passed through the system. During activation 8 g of ethyl mercaptane are added to the synthesis gas stream. The activated bauxite is carbonylated at 200 ° C. under a carbon monoxide pressure of 100 bars for 10 hours. The iron pentacarbonyl formed is continuously removed from the reactor under cooling. The aluminium oxide content of the residual bauxite amounts to 66.2% and the iron content is decreased from 17.1% to 1.2%. The rate of iron removal amounts to 93.0%.

EXAMPLE 13

100 g of dry and finely ground bauxite [aluminium oxide content 50.7%; iron oxide content 24.4% (Fe=17.1)] are admixed with 8 g of finely powdered pyrite (composition: $H_2O=1.0\%$; $S=50.6\%$; $Fe=45.5\%$; $SiO_2=0.9\%$; $Zn=0.10\%$; $Cu=0.31\%$; Pb- 0.2%; As=0.09%; Ca=0.49%; Mg=0.05%) and the mixture is heated in a 500 ml stainless steel reactor under stirring in a hydrogen stream with a heating velocity of 50°–60° C. to 500° C. and activated at this temperature in the presence of hydrogen under stirring and under atmospheric pressure for 12 hours. The activated bauxite is carbonylated under stirring at 200° C. under a carbon monoxide pressure of 100 bars for 10 hours. The liquid iron pentacarbonyl formed is removed from the reactor under cooling. The aluminium oxide content of the residual bauxite amounts to 65.6%, the iron content is decreased from 17.1% to 1.8%. The rate of iron removal amounts to 89.5%.

EXAMPLE 14

100 g of ground bauxite [aluminium oxide content 50.7%; iron oxide content 24.4% (Fe=17.1)] are admixed with 2 g of HgO and 3.35 g of sodium periodate and the mixture is charged into a 500 ml stainless steel tube reactor. The mixture is heated under the stream of synthesis gas being free of CO and blown ammonia factory gas (150–300 ml/hour) with a heating velocity of 30°–50° C./hour to 650° C. and activated at this temperature under stirring and under atmospheric pressure for 10 hours. The activated bauxite is cooled to 100° C. and carbonylated by continuously increasing the pressure of carbon monoxide gas stream from 10 bar to 160 bars for 11 hours. During this step, the temperature rises as the pressure is increased. The formation rate of iron pentacarbonyl can be followed by the rate of rise of temperature. The iron pentacarbonyl formed is condensed under pressure and continuously removed from the reactor with the carbon monoxide gas stream into an iron pentacarbonyl storing tank. The iron content of the residual bauxite is decreased from 17.1% to 1.15% which corresponds to an iron removal rate of 93.25%.

The aluminium oxide content of the bauxite remaining in the autoclave is increased from 50.7% to 66.6%.

What we claim is:

1. A process for deironing red mud and bauxite and for the preparation of iron pentacarbonyl and a raw material for the aluminum industry, which comprises the steps of:
   (a) activating the red mud or bauxite starting material at 150–800 degrees C. under a pressure of 0.1–100 bars in a reducing gas stream in the presence of one or more promoters selected from the group consisting of sulfur powder, inorganic sulfur compound, sulfur containing mineral substance, iodine and iodine compound;
   (b) carbonylating at 50–300 degrees C. under a pressure of 25–300 bars with carbon monoxide or a gas containing carbon monoxide; and
   (c) finally recovering the formed iron pentacarbonyl from the mixture of raw material of alumina.

2. The process of claim 1, wherein using a promoter in an amount of 0.1–30% by weight, calculated on the weight of the starting material.

3. The process of claim 1, wherein the reducing gas contains hydrogen.

4. The process of claim 1, wherein the reducing gas is hydrogen or a gas containing hydrogen and/or ammonia.

5. The process of claim 1, wherein the gas containing carbon monoxide is producer gas, blown gas, synthesis gas formed in the decomposition of earth gas, or generator gas.

6. A process according to claim 3, wherein the reducing gas is a hydrogen containing gas which is essentially free from carbon monoxide.

* * * * *